United States Patent [19]

Barbieri et al.

[11] Patent Number: 4,689,661

[45] Date of Patent: Aug. 25, 1987

[54] METHOD OF SIMULTANEOUSLY TRANSMITTING A PLURALITY OF TELEVISION SIGNALS ON A SINGLE RADIO LINK AND APPARATUS ADAPTED TO CARRY OUT SAID METHOD

[75] Inventors: Gianfranco Barbieri, Turin; Ugo Garola, Moncalieri, both of Italy

[73] Assignee: RAI - Radiotelevisione Italiana, Rome, Italy

[21] Appl. No.: 275,780

[22] Filed: Jun. 22, 1981

[30] Foreign Application Priority Data

Oct. 27, 1980 [IT] Italy ................................ 68641 A/80

[51] Int. Cl.[4] ......................... H04N 9/02; H04N 7/08
[52] U.S. Cl. ...................................... 358/12; 358/13; 358/142; 358/16
[58] Field of Search ..................... 358/11, 12, 13, 141, 358/142, 146, 147, 15, 16; 370/53, 60, 69, 77, 94

[56] References Cited

U.S. PATENT DOCUMENTS 4,218,697  8/1980  Leventer ............................... 358/13

*Primary Examiner*—Robert L. Richardson
*Attorney, Agent, or Firm*—Amster, Rothstein & Ebenstein

[57] ABSTRACT

The invention relates to a method and apparatus for simultaneously transmitting a plurality of television signals on a single radio link, in which the television signals are converted according to a digital (PCM) code, the digital signals are collected in suitable memories, said signals are read out at a rate multiple of the introduction rate, said signals are combined in a single sequence multiplexing, are again converted to analog signals, are transmitted through a radio link and at their arrival are again converted to a digital form, the luminance and chrominance signals are separated by means of a demultiplexer, are introduced at a predetermined rate in suitable memories, are read out from the memories at a rate which is a submultiple of the introduction rate, are converted into analog signals corresponding to the luminance and chrominance of each signal and are sent to as many PAL coders as are the television signals to be reconstituted.

11 Claims, 5 Drawing Figures

METHOD OF SIMULTANEOUSLY TRANSMITTING A PLURALITY OF TELEVISION SIGNALS ON A SINGLE RADIO LINK AND APPARATUS ADAPTED TO CARRY OUT SAID METHOD

The present invention relates to a method and apparatus for simultaneously transmitting a plurality of television signals on a single radio link.

As is well known, a television network comprises normally two discrete structures; the first one, referred to as contribution network, consists of the bundles of radio links conveying the signal from the field pickup to the program production center or from other production centers to a desired center; the second one, referred to as distribution network; consists of the bundles of radio links which convey the signal from the production center to the transmitters for the wave propagation.

Normally, the construction of the contribution network makes it possible to cope with traffic requirements even strong. However, emergency situations occur at which the demand for connections exceeds the ordinary availability. This occurs particularly for the shooting of current events for which the immediacy of the service is a requirement of primary importance, such as to justify, if necessary, even a moderate degradation of the transmitted signal.

Since in practice these situations are of an exceptional character, it is not suitable to have recourse to an increase in the channels which would involve very high costs. The problem therefore arises, which is at the basis of the present invention, of transmitting, when required, more than one signal simultaneously on a single radio link.

According to the invention, the technique of the temporal compression in the course of a television line is used. The compression of the time basis is achieved by converting the signals to the digital form by means of a linear PCM coding of the analog signal, recording the data in a memory and reading them out at a higher rate providing a compression ratio, i.e. a ratio between the data duration at the input and output of the memory respectively, equal to the ratio of the writing to reading rate.

Since the invention aims to solve the problem without modifying the circuitry of the links forming the network, the compressed data reconverted to the analog form are added to a television signal consisting only of the synchronizing signals to which some service signals are added to correctly monitor the receiver. Before the complete signal is fed to the link, it is caused to pass into a low-pass filter having a cutoff frequency corresponding to the frequency limits for which the operation of the channel is set. Generally this frequency is 6 MHz.

The method according to the invention can be applied both to monochrome and color signals.

Reference is made to the second case which is the most general, with reference to the numerical values of the G standard.

The various signals, in phase and synchronous with the line (but not necessarily in phase with the field) are separated into the luminance (Y) and color difference (R−Y and B−Y) components.

Hereinafter, for the sake of simplicity of description, reference is made to the most interesting case in which two color signals with G standard are available.

In this case the temporal luminance compression is effected in the 2:1 ratio, the duration of the active line is 26 $\mu$s and the transmitted band is 3 MHz.

Referring to the standard waveform of the television signal (CCIR-G Standard-Report 624-1) the duration of the active line is 52 $\mu$s while 12 $\mu$s are left for the horizontal blanking.

According to the invention it is suggested to reduce the blanking time from 12 $\mu$s to about 2 $\mu$s to provide the space sufficient to locate the chrominance components. There are, therefore, available about 10 $\mu$s used to introduce at alternate lines the R−Y and B−Y components of the two signals (by assigning about 5 $\mu$s to each of them). The compression ratio, taking into account the necessary margins, is 12:1 and therefore because of the 6 MHz band limitation at the link input, the actually transmitted chrominance band is 0.5 MHz.

Finally, the luminance and chrominance signals converted to the digital form and compressed in the above mentioned manner are time division multiplexed according to the following diagram:

by 26 $\mu$s $Y_1$+5 $\mu$s $(R-Y)_1$+26 $\mu$s $Y_2$+5 $\mu$s $(R-Y)_2$++2 $\mu$s service signals+26 $\mu$s $Y_1$+5 $\mu$s $(B-Y)_1$++26 $\mu$s $Y_2$+5 $\mu$s $(B-Y)_2$+2 $\mu$s service signals, after which the cycle repeats.

Before the signal so obtained is connected to the link, it is converted into the analog form by means of a PCM decoding and is band limited to 6 MHz.

At the receiving terminal a new analog to digital conversion of the signal passed through the radio link is effected to provide an expansion of the time basis and the separation, by means of digital technics, of the various components. Finally, the Y, R−Y, B−Y components of the individual signals are reconverted to the analog form and the signals are thus color recoded.

Finally, it is required to identify in the receiver the lines in which the signal R−Y is inserted and those in which instead the B−Y signal is inserted. This is achieved by one of the functions fulfilled by the coded word carrying the vertical synchronized information.

The apparatus adapted to carry out the described method comprises a transmitter system and a receiver system connected by a radio link of a type known per se.

The transmitter system comprises two parallel connected channels, each fed by one of the video signals to be transmitted and having a separator for separating the luminance Y from the chrominance signals R−Y and B−Y, three analog to digital converters for the three signals obtained, two memories for storing the luminance and the chrominance signals respectively. The two channels are connected to a multiplexer whose output is connected to a digital to analog converter. Connected between the low-pass filter connected at the output to the radio link and the converter is the service signals (auxiliary signals) adder.

The receiver input is connected, through an analog to digital converter, to a demultiplexer which separates the luminance and chrominance components of the two signals and sends them in four memories whose outputs reconstitute, through six digital to analog converters, the Y, R−Y and B−Y signals of each program to be sent to the respective PAL encoder.

The input is also connected to an auxiliary signal separator which feeds two synchronism regenerating circuits for the first and the second of the transmitted signals respectively.

For the sake of a better clarity, reference is made to the accompanying drawings in which.

Figure 1:
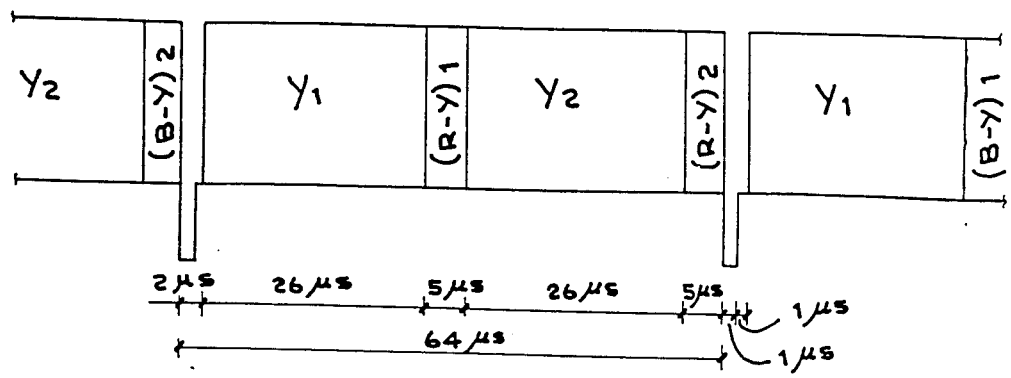
FIG. 1 shows the waveform of the transmitted signal.

As is seen from the drawings (FIGS. 1 and 5) the duration of a line (64 μs) is used for 2 μs to transmit auxiliary signals, 26 μs to transmit the $Y_1$ luminance of the first program, 5 μs to transmit the $(R-Y)_1$ chrominance, 26 μs to transmit the $Y_2$ luminance of the second program and finally 5 μs for the $(R-Y)_2$ chrominance of the second program.

Figure 2:
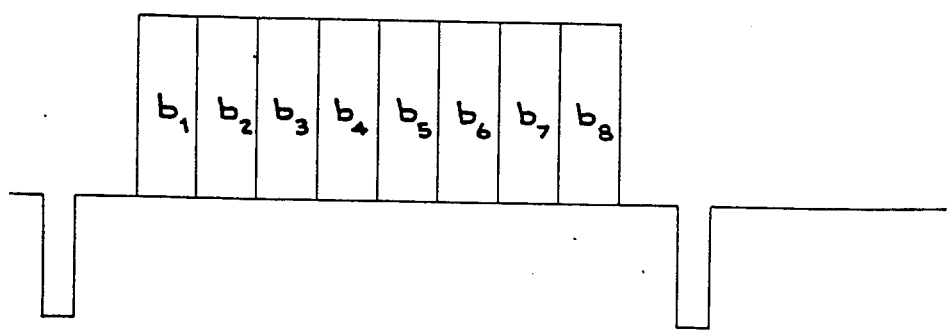
FIG. 2 shows the 8 bit coded word.

FIG. 2 shows an auxiliary signal formed by 8 bits where $b_1$ is the information of the vertical synchronizing signal, $b_2$ is a parity bit, $b_3$ is the information of the R—Y, B—Y alternation, $b_4$ is a parity bit, $b_5$ is the monochrome or color signal information, $b_6$ is a parity bit, $b_7$ is a parity bit, $b_8$ is a parity bit.

The parity bits form a Hamming code.

Figure 3:
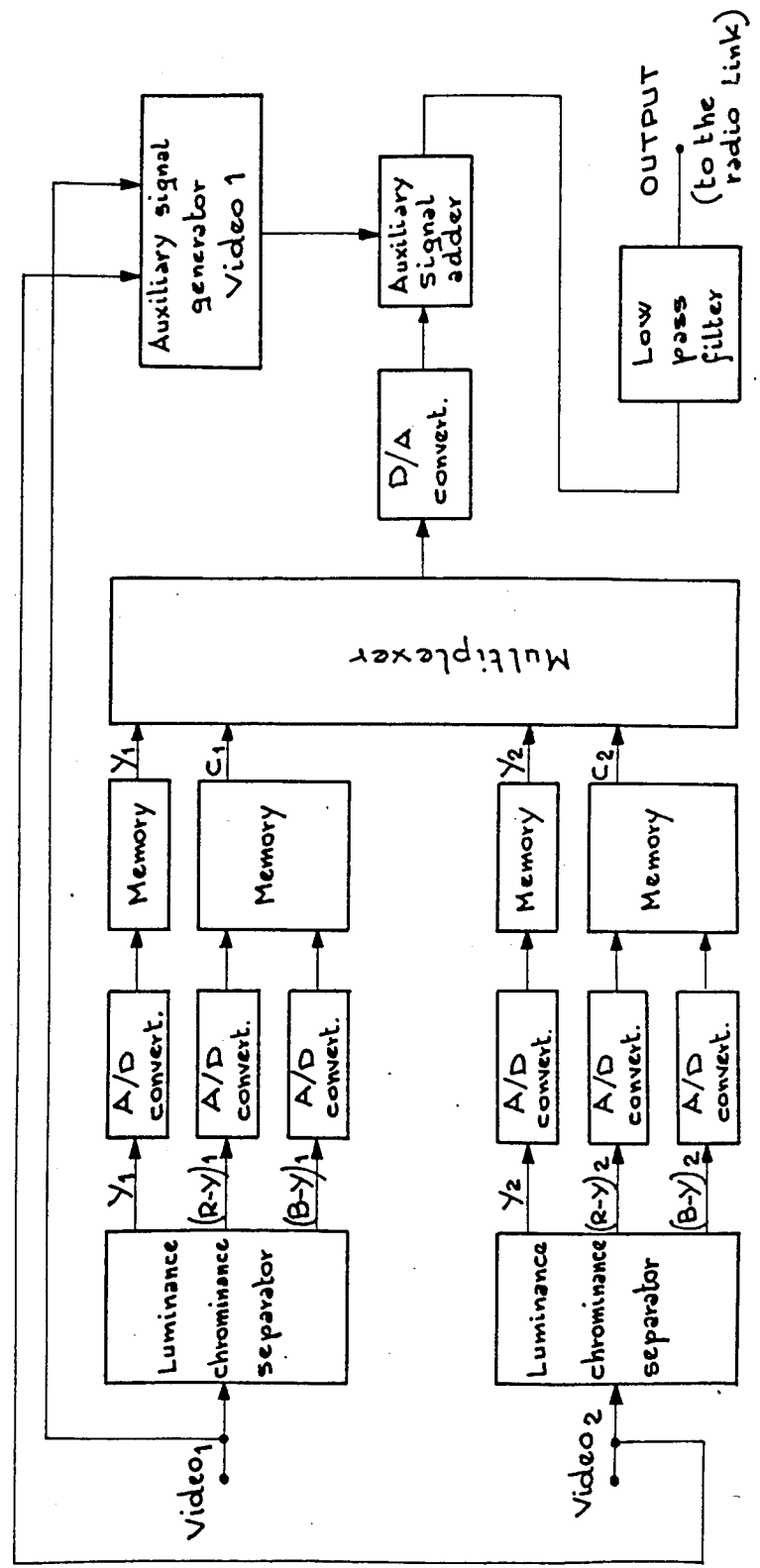
FIG. 3 is the preferred diagram of the transmitter circuit.

Referring now to FIG. 3, the transmitter comprises two parallel connected channels, each comprising a separator, three analog-digital converters and two memories. The outputs of the memories are connected to four inputs of a multiplexer whose single output is connected to the input of a digital-analog converter. The output of the latter is connected to an input of an auxiliary signal adder having a second input connected to the output of an auxiliary signal generator. Finally, the output of the auxiliary signal adder is connected to the input of a low-pass filter, whose output is connected to the modulator of the radio link.

The separators, analog-digital converters, memories, multiplexer, auxiliary signal generator and low-pass filter consist of conventional circuits which are well-known to those skilled in the art, and so are not described in further detail.

The described transmitter operates as follows:

Each of the two video signals (PAL G standard) 1 and 2 is supplied to the respective separator circuit which separates the luminance component Y from the chrominance components R—Y and B—Y. The separation occurs with the usual processing of the PAL decoding which is well-known to those skilled in the art. The three above mentioned components are thereafter converted into digital form in the respective analog-digital converters, by means of a linear PCM encoding and then stored in the respective memories, bearing in mind that the outputs of the analog-digital converters for the (R—Y) and (B—Y) chrominance signals are both supplied to a single memory.

The read-out of the digital data from the memories takes place at a speed higher than the read-in speed and is performed sequentially for the Y, R—Y and B—Y signals. In other words, a signal compression is carried out. More particularly, the luminance signal Y is read out from the respective memory with a speed twice the read-in speed, whereas each of the chrominance components R—Y and B—Y is read out with a speed 12 times the read-in speed. In addition, since it is desired to transmit the R—Y and B—Y components on alternate lines, there is a single output from the memory in which these components are stored which is generally referred to as $C_1$ or $C_2$ depending on whether chrominance components of the video signal 1 or 2 are involved. As is readily apparent to those of ordinary skill in the art, the start signals of the read-out operations are supplied to the various memories with a suitable phase shifting so that the read-out luminance and chrominance signals of the two video signals never overlap and result therefore in a sequential transmission pattern of the various signals as show in FIG. 5.

Figure 4:
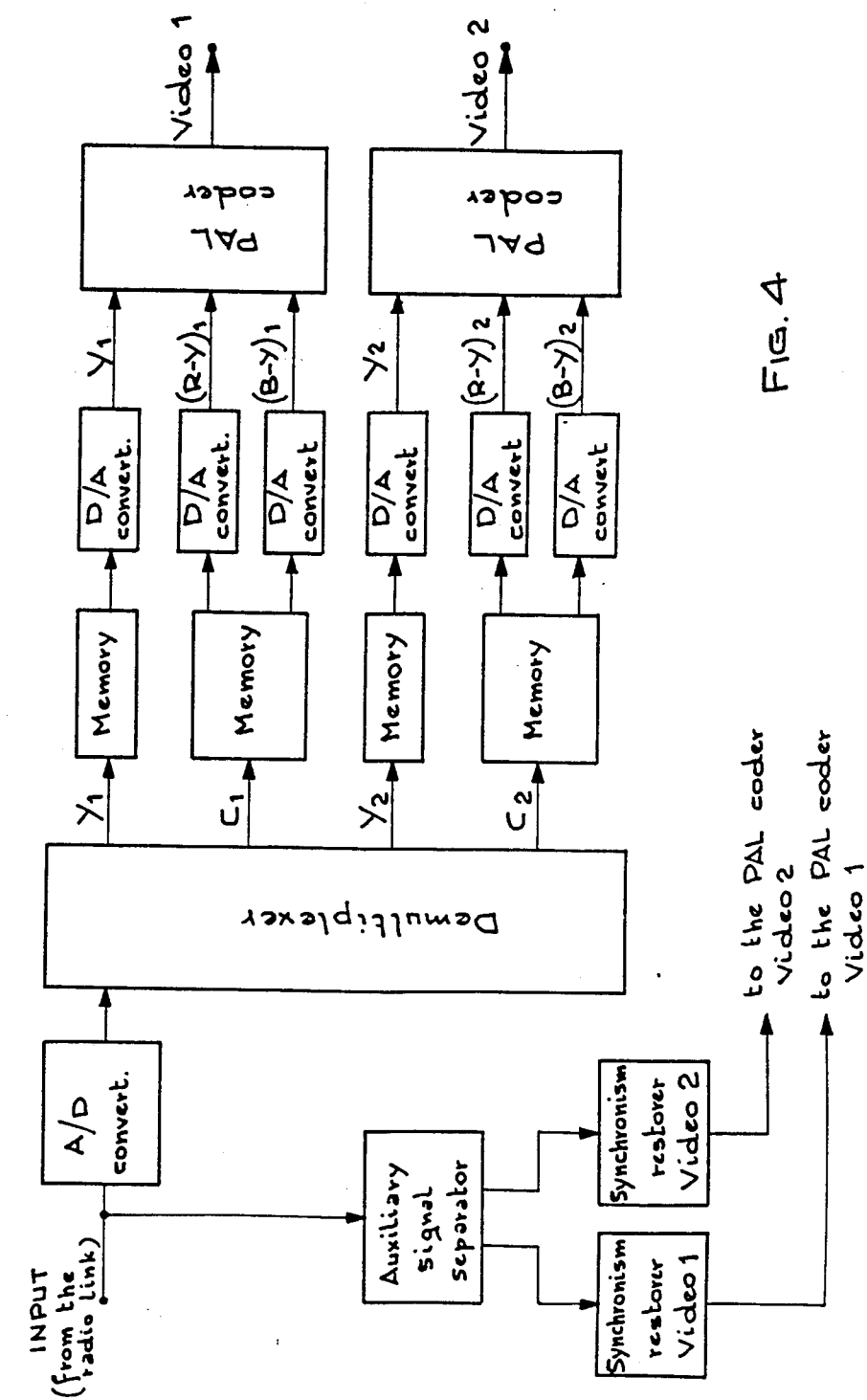
FIG. 4 is the diagram of the receiver circuit.
Figure 5:
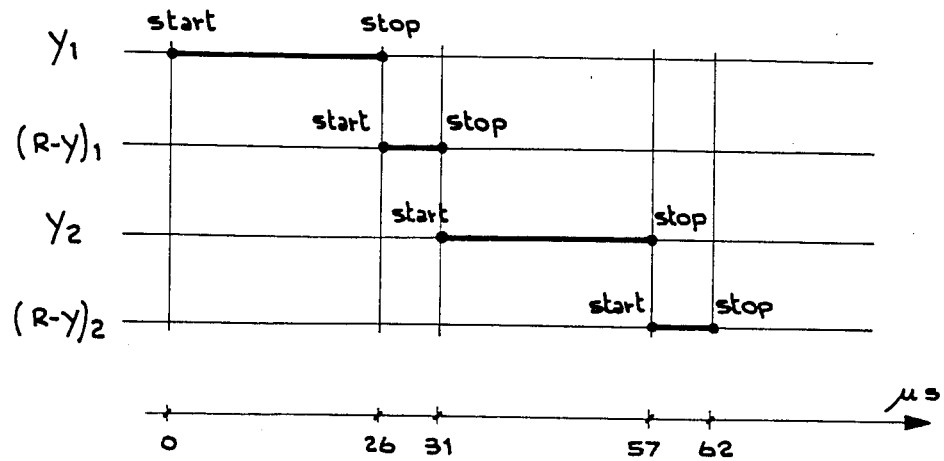
FIG. 5 is the time utilization graph in the transmission of two subsequent lines, in the case of the G standard.
Figure 5:
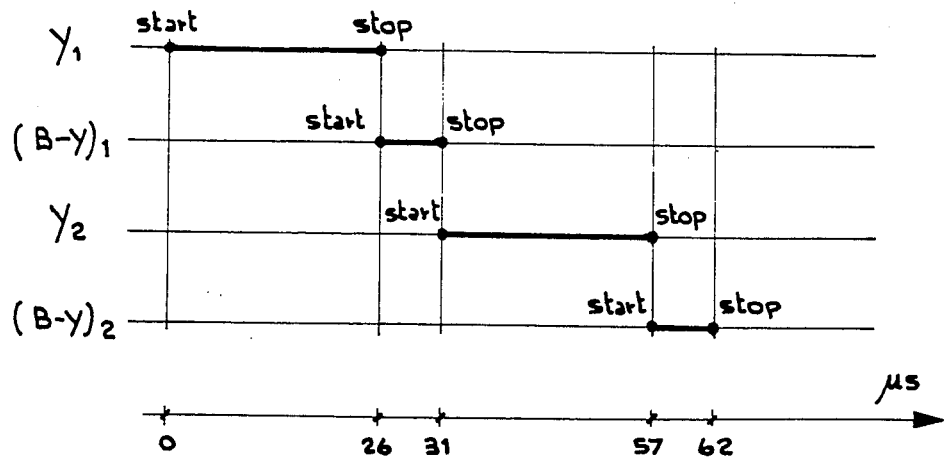

For generating the start signals adapted to provide the timings of FIG. 5, a timing circuit (not shown) may be utilized to generate all signals required for driving with a correct timing the read-out and read-in functions of the memories. In other words, in the diagrams of FIGS. 3 and 4, for the sake of clarity only the main information signals (Y, C) and leaving the memories are shown, but no service signals (i.e., read-out and writing enable signals of the memories) have been shown. Similarly, all the service signals (clock, etc.) adapted to drive the A/D and D/A converters have been omitted. The auxiliary signal generators shown in FIG. 3 have been instead expressly included, because they deal with the information properly transmitted which is indispensable in reception for the correct decoding of the message.

The multiplexer logically combines the digital signals read out from the various memories so that at its output a single signal appears consisting of a sequence of time compressed luminance and chrominance signals. This digital signal is converted into an analog signal in the digital-analog converter, and connected to the output of the multiplexer, which is a linear PCM decoder.

The time division multiplexing techniques have been widely used in telephony for over twenty years and are referred to in all modern telephone books. See for example:

*Transmission Systems for Communications*, Bell Telephone Laboratories, Inc., 1959 -rev. 4th ed. 1971; and

*Communication Systems Principles*, Peyton Z. Peebles, Jr., Addison-Wesley Pub. Co., Inc. 1976.

There are generated in the auxiliary signal generator; the line synchronism of a reduced duration (1 us), the sinusoidal signal packets at a subcarrier frequency, the coded word to identify the vertical synchronism as well as the correct R—Y and B—Y alternance, and finally the "white bar" signal.

A "sinusoidal signal packet" at a subcarrier frequency is a continuous sinusoidal signal at a frequency of 4.433618 MHz (chrominance subcarrier in the PAL system) having a duration of 52 us and a peak to peak amplitude of 0.7 V, which is inserted at the grey level (0.35 V) in the active line interval.

A "white bar" signal is a signal which, for the whole duration of the active line (52 u sec. out of 64 u sec.), is kept constantly at the white level (i.e., +0.7 V), with respect to the blanking level.

In the auxiliary signal adder the auxiliary signals from the auxiliary signal generator are added to the analog signal from the output of the digital-analog converter so as to obtain a signal as shown in FIG. 1. The output of the adder is connected to a low-pass filter having a cut off frequency at 6 MHz to avoid feeding possible spurious components at a higher frequency, to the modulator of the radio link.

The receiver is shown in FIG. 4. It comprises an analog-digital converter connected to a demultiplexer whose four outputs are each connected to a memory. Two of these memories serve to store the two luminance signals from the demultiplexer, whereas the other two memories serve to store each the two chrominance signals of each video signal from the demultiplexer. The luminance signal memories are each connected to a digital-analog converter, whereas the chrominance memories are each connected to two digital-analog converters. The outputs of the digital-analog converters are connected three by three to two PAL encoders which restore the two channels for the two video signals 1 and 2.

The operation principle of the receiver is as follows:

The analog signal from the demodulator of the radio link with the two time compressed video signals 1 and 2 is converted to a digital form (by means of a linear PCM encoding) in the analog-digital converter. The digital data relating to the individual luminance and chrominance components are then separated in the demultiplexer in the individual signals which had been combined in a single signal in the multiplexer of the transmitter and are read out from the memories. In order to effect a correct demultiplexing the "start" read-in signals of the memories are time shifted with the same law with which were time shifted the read-out start signals of the memories in the transmitter, i.e., with the law illustrated in FIG. 5. The read-out of the memories in which the digital data relating to the luminance signals are stored occurs at a speed equal to half the read-in speed and the read-out of the memories in which the digital data relating to the chrominance signals are stored occurs at a speed 12 times lower than the read-in speed. In this manner the data are used from the memories with the time basis expanded to the same extent to which it had been compressed in the transmitter so that the signals resume the original form which they had prior to being time-compressed in the multiplexer of the transmitter.

Because of the transmission on alternate lines of the R−Y and B−Y components, there would appear, at the output of the respective memories, at any line, only one of the two sets of information, the missing information is therefore reconstructed by simply reading out again the memory data relating to the preceding line. The individual components of the video signals are reconverted to an analog form (by means of a linear PCM decoding) in the digital-analog converters and finally color re-encoded in the PAL encoders.

In order to regenerate the synchronizing signals required to correctly drive the PAL encoders, i.e., chrominance subcarrier, horizontal synchronizing signal and vertical synchronizing signal, the auxiliary signals are used which had been inserted in the adder of the transmitter in the free lines of the vertical blanking interval. To this purpose the receiver is equipped with an auxiliary signal separator having two outputs connected to a synchronism regenerator for the video signal 1 and video signal 2 respectively. The outputs of the synchronism regenerators are connected to the associated PAL encoder.

The present invention has been illustrated and described with reference to a preferred embodiment and as hint to some change, however further changes and modifications are still possible in practice without departing from the scope of the invention.

For example, without substantial modifications, by slightly altering the indicated times, the system lends itself to the use with signals having a standard different from the G standard. In addition, by varying the compression ratios it is possible either to transmit more than two signals in a single radio link or to favour one of the programs with respect to the other (or the others) from the point of view of the signal degradation, by assigning to the favourite program a higher part of the available interval.

What is claimed is:

1. A method of simultaneously transmitting a plurality of sets of analog television signals on a single transmission link, comprising the steps of:

converting a first of the sets of analog signals to a corresponding set of digital signals;

inputting said corresponding set of digital signals to a first memory at a first predetermined rate;

outputting said corresponding set of digital signals from said memory at a second predetermined rate, said second predetermined rate being a multiple of said first predetermined rate;

multiplexing said corresponding set of digital signals with a second of the sets of analog signals to form a multiplexed signal;

transmitting said multiplexed signal from a transmitter;

receiving said multiplexed signal at a receiver;

de-multiplexing said corresponding set of digital signals and said second set of analog signals from said received multiplexed signal;

inputting said de-multiplexed corresponding set of digital signals to a second memory at a third predetermined rate;

outputting said multiplexed corresponding set of digital signals from said second memory at a fourth predetermined rate; and re-converting said de-multiplexed corresponding set of digital signals to the original analog signal.

2. The method of claim 1 wherein the television signals being transmitted are color signals, having luminance and chrominance components, further comprising the steps of:

separating the luminance and chrominance components from the first set of analog signals prior to their conversion to the corresponding set of digital signals;

outputting the luminance and chrominance components of the corresponding set of digital signals from the first memory at different second predetermined rates;

inputting the luminance and chrominance components of the corresponding set of digital signals to the second memory at different third predetermined rates; and re-combining the luminance and chrominance components of the de-multiplexed corresponding set of digital signals.

3. The method of claim 2, wherein:

the transmitted color signals are standard G television signals having blanking intervals;

the second predetermined rate of the luminance component is approximately twice the first predetermined rate;

the second predetermined rate of the chrominance component is approximately twelve times the first predetermined rate;

the multiplexing of the corresponding set of digital signals with the second set of analog signals is performed according to the formula 26 $\mu$s $Y_1$+5 $\mu$s $(R-Y)_1$+26 $\mu$s $Y_2$+5 $\mu$s $(R-Y)_2$+2 $\mu$s of service signals+26 $\mu$s $Y_1$+5 $\mu$s $(B-Y)_1$+26 $\mu$s $Y_2$+5 $\mu$s $(B-Y)_2$+2 $\mu$s of service signals; and the de-multiplexed second set of signals is relayed to the next step in the transmission link;

the method further comprising the step of:

reducing the duration of the standard blanking interval to approximately 2 $\mu$s.

4. The method of claim 3 further comprising the steps of:

transmitting sinusoidal packets as a subcarrier frequency in the free lines of the vertical blanking interval, the packets containing coding for the de-multiplexing.

5. The method of claim 2 further comprising the steps of:

transmitting sinusoidal packets as a subcarrier frequency in the free lines of the vertical blanking interval, the packets containing coding for the de-multiplexing.

6. The method of claim 1 further comprising the step of transmitting auxiliary signals, the auxiliary signals corresponding to the vertical synchronizing of the various channels, the indication of whether the signals are monochrome or in color, and the beginning of the two chrominance components of color signals.

7. The method of claim 6 wherein the auxiliary signals are transmitted in the vertical blanking interval.

8. The method of claim 6 further comprising the steps of:

transmitting sinusoidal packets as a subcarrier frequency in the free lines of the vertical blanking interval, the packets containing coding for the de-multiplexing.

9. The method of claim 1 further comprising the steps of:

transmitting sinusoidal packets as a subcarrier frequency in the free lines of the vertical blanking interval, the packets containing coding for the de-multiplexing.

10. The method of claim 1 further comprising transmitting a white bar on a free line of the vertical blanking interval for referencing the video level.

11. Apparatus for simultaneously transmitting a plurality of television signals on a single transmission link, the apparatus comprising:

a plurality of parallel channels, each of said channels being fed by one of the signals to be transmitted, each channel including:

a separator coupled to receive each of said signals for separating the luminance component of at least said one signal from the chrominance components thereof;

an analog to digital converter coupled to each of the outputs of the separator;

first and second memories for receiving the outputs of said analog to digital converters and outputting said outputs at a rate higher than the rate at which they were received by said memories;

the apparatus further including a multiplexer coupled to receive the outputs of said parallel channels, said multiplexer having an output;

a digital to analog converter coupled to said output of said multiplexer;

an auxiliary signal generating circuit having an output, and being coupled to one of said channels;

an adder having an output for adding the output of said auxiliary signal generating circuit and said output of said digital to analog converter;

a transmitter for transmitting said output of said adder;

a receiver for receiving said transmission from said transmitter;

a separator for separating from said received transmission the components thereof corresponding to the outputs of said auxiliary signal generating circuit and digital to analog converter respectively;

an analog to digital converter in the receiver for receiving from said separator, said component of said received transmission corresponding to the output of said digital to analog converter, said analog to digital converter having an output;

a de-multiplexer for de-multiplexing said output of said analog to digital converter, said de-multiplexing having three outputs for each channel, said three outputs thereof corresponding to the luminance and two chrominance signals of that channel; and a memory device in the receiver for receiving said outputs of said de-multiplexer and outputting said luminance and chrominance signals at a rate corresponding to said rate at which they were received by said first and second memories.

* * * * *